US012639909B2

(12) United States Patent
Jain et al.

(10) Patent No.: US 12,639,909 B2
(45) Date of Patent: May 26, 2026

(54) LOCATION OPERATION CONFLICT RESOLUTION

(71) Applicant: Adobe Inc., San Jose, CA (US)

(72) Inventors: Arushi Jain, Ashok Vihar (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 595 days.

(21) Appl. No.: 17/891,643

(22) Filed: Aug. 19, 2022

(65) Prior Publication Data

US 2024/0062503 A1     Feb. 22, 2024

(51) Int. Cl.
*G06V 10/24* (2022.01)
*G06V 10/22* (2022.01)

(52) U.S. Cl.
CPC ............ *G06V 10/24* (2022.01); *G06V 10/235* (2022.01)

(58) Field of Classification Search
CPC . G06T 11/60; G06T 2210/12; G06T 2200/24; G06T 2207/20092; G06T 2207/20101; G06V 10/235; G06V 10/25; G06F 3/048; G06F 3/0484; G06F 3/04845; G06F 3/0486; G06F 3/04842
See application file for complete search history.

(56) References Cited

U.S. PATENT DOCUMENTS

| 5,500,927 | A | 3/1996 | Sander-Cederlof et al. |
| 6,065,021 | A | 5/2000 | George |

| 9,323,436 | B2 | 4/2016 | Altin et al. |
| 11,200,073 | B1 * | 12/2021 | Voicu ..................... G06F 3/0482 |
| 11,372,529 | B1 | 6/2022 | Jain et al. |
| 11,907,515 | B2 | 2/2024 | Jain et al. |
| 2003/0206169 | A1 | 11/2003 | Springer et al. |
| 2004/0113910 | A1 | 6/2004 | Tsai et al. |
| 2005/0259882 | A1 | 11/2005 | Dewaele |
| 2007/0296825 | A1 | 12/2007 | Ito et al. |
| 2008/0256484 | A1 | 10/2008 | Kraft et al. |
| 2009/0040218 | A1 | 2/2009 | Museth et al. |
| 2009/0074302 | A1 | 3/2009 | Kishi |
| 2012/0051655 | A1 | 3/2012 | Oto |
| 2012/0087590 | A1 | 4/2012 | Kato et al. |
| 2012/0092340 | A1 | 4/2012 | Sarnoff et al. |

(Continued)

OTHER PUBLICATIONS

"Creating Bounding rotated boxes and ellipses for contours", OpenCV, Open Source Computer Vision [online] [retrieved Jun. 8, 2021]. Retrieved from the Internet <https://docs.opencv.org/3.4.12/de/d62/tutorial_bounding_rotated_ellipses.html>., Oct. 11, 2020, 2 pages.

(Continued)

*Primary Examiner* — Sumati Lefkowitz
*Assistant Examiner* — Michael Adam Shariff
(74) *Attorney, Agent, or Firm* — FIG. 1 Patents

(57) ABSTRACT

Location operation conflict resolution techniques are described. In these techniques, a likely user's intent is inferred by a digital image editing system to prioritize anchor points that are to be a subject of a location operation. In an example in which multiple anchor points qualify for location operations at a same time, these techniques are usable to resolve conflicts between the anchor points based on an assigned priority. In an implementation, the priority is based on selection input location with respect to an object.

20 Claims, 8 Drawing Sheets

(56)          References Cited

U.S. PATENT DOCUMENTS

| 2019/0287302 | A1 | | 9/2019 | Bhuruth |
| 2020/0118309 | A1 | | 4/2020 | Biswas et al. |
| 2020/0151944 | A1 | * | 5/2020 | Jain .......................... G06F 7/764 |
| 2023/0040866 | A1 | | 2/2023 | Jain et al. |

OTHER PUBLICATIONS

"Final Office Action", U.S. Appl. No. 16/805,643, filed Jan. 18, 2022, 23 pages.

"Non-Final Office Action", U.S. Appl. No. 16/805,643, filed Aug. 27, 2021, 23 pages.

"Non-Final Office Action", U.S. Appl. No. 17/392,675, filed Dec. 24, 2021, 8 pages.

"Notice of Allowance", U.S. Appl. No. 17/392,675, filed Feb. 25, 2022, 7 pages.

"Supplemental Notice of Allowability", U.S. Appl. No. 17/392,675, filed May 2, 2022, 2 pages.

"U.S. Appl. No. as Filed", U.S. Appl. No. 16/805,643, filed Feb. 28, 2020, 44 pages.

U.S. Appl. No. 16/805,643, filed Aug. 10, 2022 , "Non-Final Office Action", U.S. Appl. No. 16/805,643, filed Aug. 10, 2022, 26 pages.

Martín-Albo, Daniel , et al., "Strokes of insight: User intent detection and kinematic compression of mouse cursor trails", Informa-tion Processing & Management, vol. 52, No. 6 [retrieved Jul. 5, 2022]. Retrieved from the Internet <https://drive.google.com/file/d/1xMVpcAhMbfyWDV27BiVeEBavfF40Jnt3/view>., Apr. 28, 2016, 26 Pages.

McCrae, James , et al., "Sketching Piecewise Clothoid Curves", SBM'08: Proceedings of the Fifth Eurographics conference on Sketch-Based Interfaces and Modeling [retrieved Apr. 14, 2021]. Retrieved from the Internet <http://diglib.eg.org/bitstream/handle/10.2312/SBM.SBM08.001-008/001-008.pdf?sequence=1&isAllowed=y>., Jun. 2008, 8 pages.

Stanimirović, Predrag S, et al., "Accelerated gradient descent meth-ods with line search", Numerical Algorithms 54 [retrieved Oct. 25, 2021]. Retrieved from the Internet <https://doi.org/10.1007/s11075-009-9350-8>., Dec. 10, 2009, 18 pages.

Yang, Junyeong , et al., "Curve Fitting Algorithm Using Iterative Error Minimization for Sketch Beautification", 2008 19th Interna-tional Conference on Pattern Recognition [retrieved Jan. 12, 2022]. Retrieved from the Internet <https://doi.org/10.1109/ICPR.2008.4761535>., Dec. 2008, 4 pages.

U.S. Appl. No. 17/833,065, "Non-Final Office Action", U.S. Appl. No. 17/833,065, Oct. 2, 2023, 10 pages.

U.S. Appl. No. 17/833,065, "Notice of Allowance", U.S. Appl. No. 17/833,065, Nov. 8, 2023, 8 pages.

U.S. Appl. No. 16/805,643, "Final Office Action", U.S. Appl. No. 16/805,643, Nov. 8, 2022, 8 pages.

* cited by examiner

300 —

Position Control System 116

Anchor Points 302

Conflict Resolution System 120

Anchor Point Priority Module 304

Distance Module 308

Aspect Priority 222

Anchor Point Priority 306

Anchor Point Resolution Module 310

Resolved Anchor Point 312

Location Operation Module 314

Location Operation 316

Snapping Operation 318

Alignment Operation 320

Spacing Operation 322

User Interface Rendering System 324

400

500

900

1000

1100

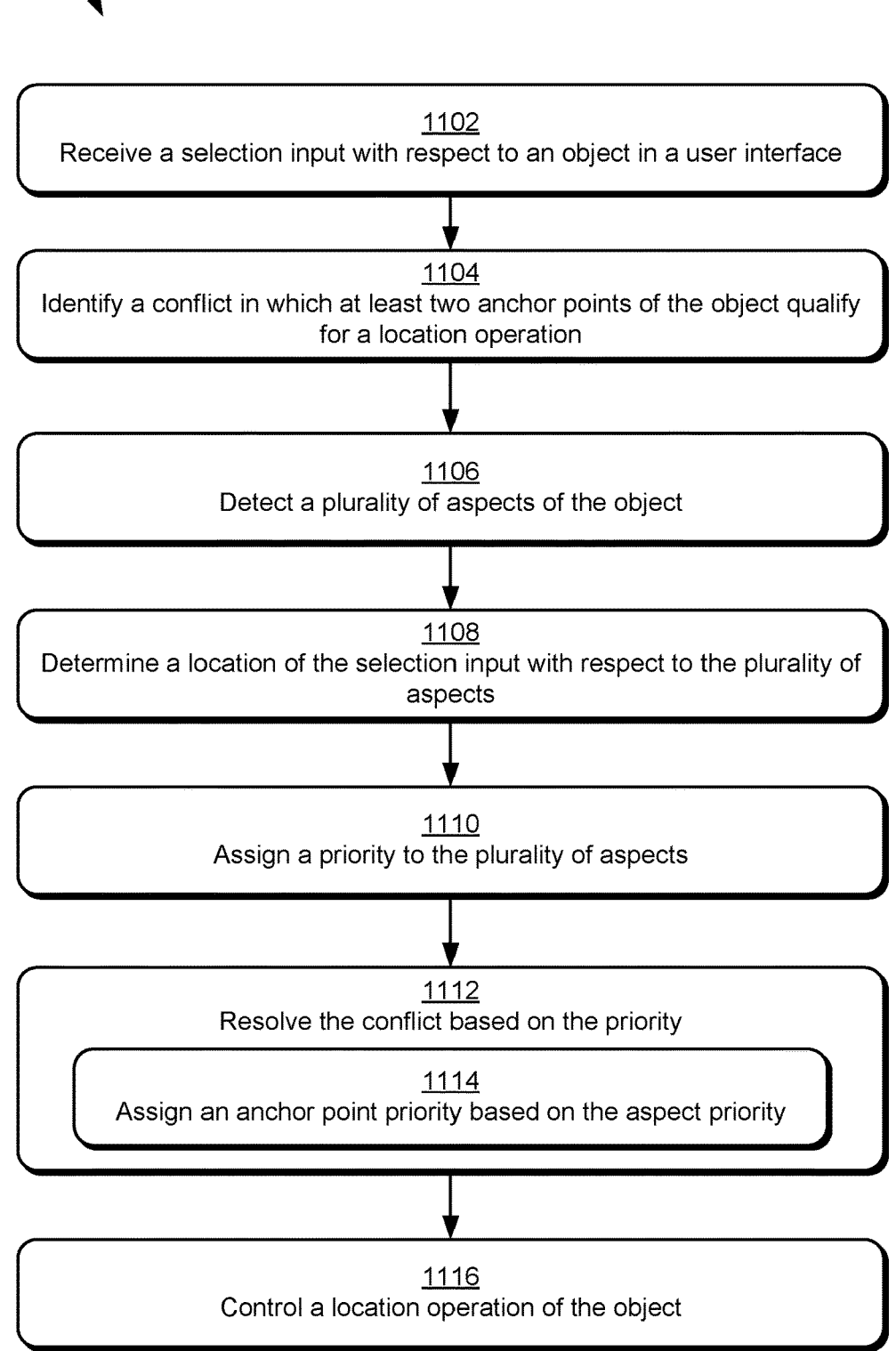

1102
Receive a selection input with respect to an object in a user interface

1104
Identify a conflict in which at least two anchor points of the object qualify for a location operation 1106
Detect a plurality of aspects of the object 1108
Determine a location of the selection input with respect to the plurality of aspects 1110
Assign a priority to the plurality of aspects 1112
Resolve the conflict based on the priority 1114
Assign an anchor point priority based on the aspect priority 1116
Control a location operation of the object

LOCATION OPERATION CONFLICT RESOLUTION

BACKGROUND

Digital image complexity is ever increasing. For example, digital images are configurable to include a multitude of different objects having a variety of configurations, including vector objects, raster objects, and so forth. Consequently, digital image editing systems are continually confronted with a variety of challenges to address this complexity to aid arrangement of objects within the digital images.

Alignment and spacing of objects are some of the most fundamental principles of visual perception as these convey relationships of the objects to each other. Accordingly, functionality has been developed for implementation by digital image editing systems to assist in alignment and spacing. However, conventional techniques to do so suffer from numerous challenges that limit accuracy and applicability of these conventional techniques due to the ever-increasing complexity of digital content.

SUMMARY

Location operation conflict resolution techniques are described. In these techniques, a likely user's intent is inferred by a digital image editing system to prioritize anchor points that are to be a subject of a location operation. In an example in which multiple anchor points qualify for location operations at a same time, these techniques are usable to resolve conflicts between the anchor points based on an assigned priority. In an implementation, the priority is based on selection input location with respect to an object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 11 is a flow diagram depicting a procedure in an example implementation of location operation conflict resolution.

DETAILED DESCRIPTION

Overview

Figure 1:
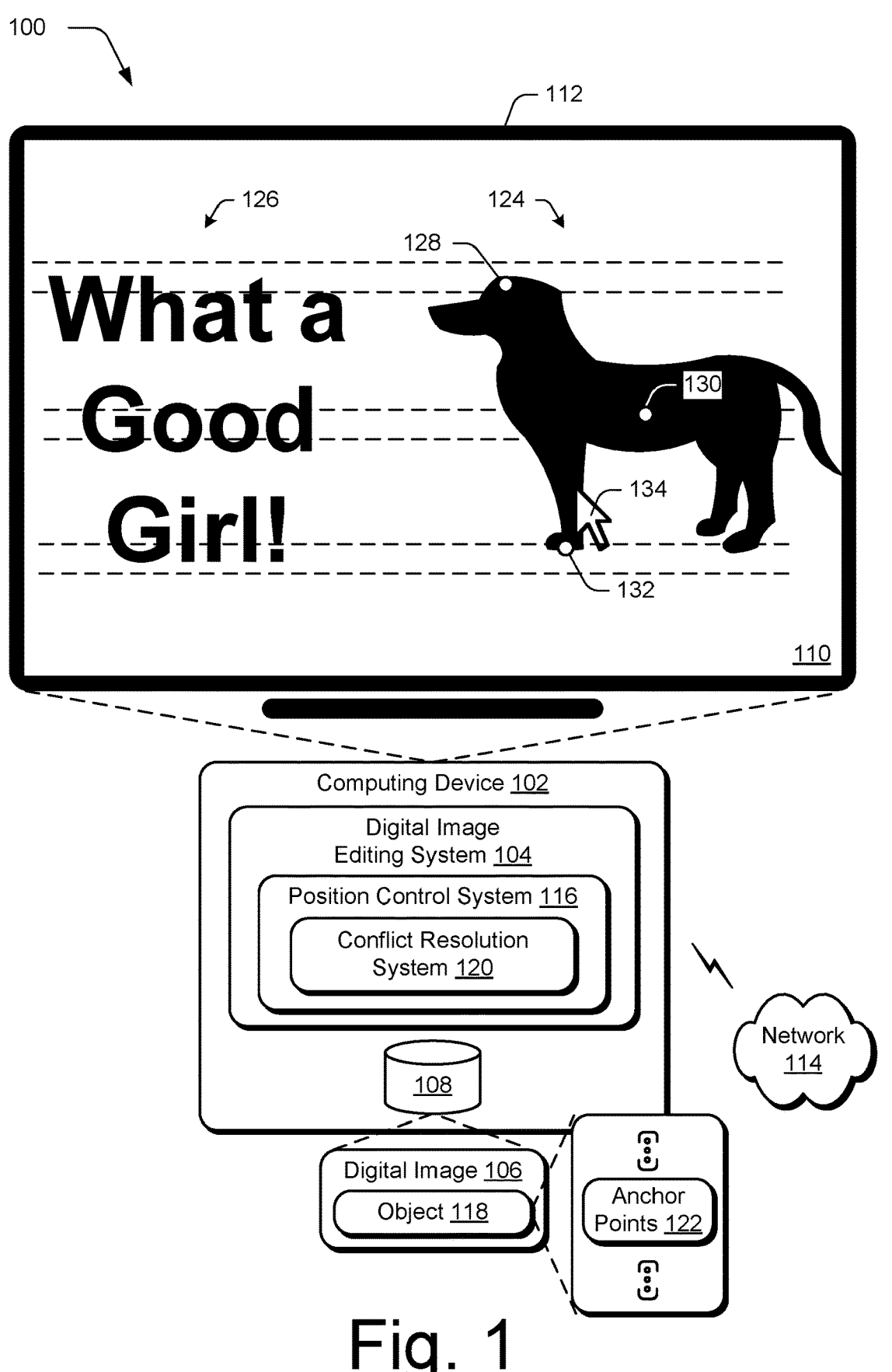
FIG. 1 depicts an example of a location operation conflict resolution environment.

Conventional techniques used to aid in positioning of objects as part of creating and editing a digital image often fail for their intended purpose. This is often the case because conventional techniques can become oversaturated due to a complexity and multitude of objects included in a digital image.

Consider a scenario in which a location operation is to be used to aid alignment between first and second objects. Each of these objects are configurable to include a plurality of anchor points that serve as a basis to perform these operations. In an example in which a visual guide is output to guide spacing, this is performed when anchor points are within a threshold distance (e.g., proximity) of each other. However, in some instances multiple anchor points of the objects qualify for location operations at the same time. This causes output of a plurality of guides to achieve different results that are confusing and often conflict with each other. This hinders operation of a digital image editing system and devices that implement these systems. Further, this challenge is compounded in instances involving a multitude of objects within the digital image.

To address these challenges, location operation conflict resolution techniques are described. In these techniques, a likely user's intent is inferred by a digital image editing system to prioritize anchor points that are to be a subject of a location operation. Continuing the example above in which multiple anchor points qualify for location operations at a same time, these techniques are usable to resolve conflicts between the anchor points based on an assigned priority. As a result, operation of digital image editing systems and corresponding devices that implement these techniques is improved.

In one example, location of a selection input with respect to a digital object is utilized to infer user intent. To do so, a selection input is received (e.g., from a cursor control device, gesture, and so forth) to select an object in a user interface that is to be a subject of a location operation. The selection input, for instance, is received to select and move the object for positioning in relation to another object, e.g., through a click-and-drag operation.

In response, a digital image editing system detects a plurality of aspects of the object. Aspects refer to how the object is "looked at." Therefore, the aspects of the object are definable as respective directions, at which or from which, the object is viewed. The digital image editing system, for instance, detects the plurality of aspects by first defining a bounding box for the object, e.g., based on minimum and maximum X and Y coordinates. The aspects are then defined in this example to include the sides of the bounding box as well as a center of the bounding box. Other examples are also contemplated, including techniques based on a boundary of the object, directions (i.e., viewpoints), and so forth.

The digital image editing system then assigns a priority to the aspects based on a location of the selection input with respect to the aspects. Continuing with the previous example, respective distances between a location of the selection input and the aspects are determined. The priority is then assigned by ordering the aspects based on closeness to the location of the selection input. In this way, the priority infers a likely intent of the selection input based on relative proximity of the aspects to the location. This priority is then usable to resolve conflicts between anchor points for use in location operations.

The selection input, for instance, is used to select and move the object to reposition the object with respect to another object in a user interface. Location operations are employed by the digital image editing system to aid this positioning, e.g., through use of a snapping operation, alignment operation, spacing operation, and so forth. As the object is moved, the digital image editing system determines that multiple anchor points of the objects qualify for a location operation. To resolve this conflict, the priority assigned to the aspects is utilized.

In one example, distances of the anchor points to a nearest one of the plurality of aspects is determined. Priority is then assigned to the anchor points based on the corresponding priority of the nearest aspects. As a result, the digital image editing system infers a likely user's intent and minimizes extraneous and often confusing visual guides and operations. Further, this priority is maintained through the selection, therefore reducing computation resource consumption otherwise caused by recomputing the priority.

A selection input disposed close to a bottom of an object, for instance, is utilized to give priority to the aspect corresponding to the bottom of the object. Further, the priority is likely indicative of a user's intent involving positioning involving the bottom of the object that is maintained through the positioning operation. Therefore, in a conflict between two anchor points that both qualify for a location operation, the priority is given to the anchor point having the highest priority. In this way, operation of a user interface and devices that implement digital image editing systems is improved and overcomes conventional challenges. Further discussion of these and other examples is included in the following discussion and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ conflict resolution techniques for anchor points in location operations as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a digital image editing system 104. The digital image editing system 104 is implemented at least partially in hardware of the computing device 102 to process and transform a digital image 106, which is illustrated as maintained in storage 108 (e.g., a computer-readable storage medium) of the computing device 102. Such processing includes creation of the digital image 106, modification of the digital image 106, and rendering of the digital image 106 in a user interface 110 for output, e.g., by a display device 112. Digital images 106 include any form of visual presentation that is capable of being rendered for display in the user interface 110, e.g., raster images, vector objects, and so forth. Although illustrated as implemented locally at the computing device 102, functionality of the digital image editing system 104 is also configurable in whole or in part via functionality available via the network 114, such as part of a web service or "in the cloud."

An example of functionality incorporated by the digital image editing system 104 to process the image 106 is illustrated as a position control system 116. The position control system 116 is configured to control operations involving location and arrangement of objects 118 within the digital image 106. Objects 118 are also configurable in a variety of ways, examples of which include vector objects, raster objects, or any other object that is capable of being rendered as part of the digital image 106 in the user interface 110 by the display device 112.

The position control system 116 includes a conflict resolution system 120. The conflict resolution system 120 is configured to resolve conflicts between anchor points 122 that are used as part of a location operation. In this way, the location operation has increased accuracy and follows a likely user's intent in executing these operations.

In the illustrated user interface 110, examples of the object 118 are depicted that include a first object 124 depicted as a dog and a second object 126 that includes text. The first object 124 is then selected via a selection input 134 for positioning with respect to the second object 126. A location operation is made available via the position control system 116 to aid arrangement of the first object 124 with respect to the second object 126.

The first object 124 includes first, second, and third anchor points 128, 130, 132 that qualify for location operations as being within threshold distances of corresponding anchor points of the text, e.g., corresponding to a top, middle, and bottom of the second object 126 as illustrated using dashed-line intervals. In conventional techniques, this causes output of visual guides and behaviors (e.g., snapping) that have quite different effects on alignment of the objects, e.g., the dog with the text. For example, in conventional techniques a content creator would be unaware as to which of the anchor points are used or even which location operations are used for those anchor points, e.g., snapping, spacing, and so forth to the top, middle, or bottom of the text.

Through use of the conflict resolution system 120, however, conflicts are resolved between these anchor points, e.g., such that a single location operation is resolved and made available based on an inferred user's intent. As a result, this overcomes conventional challenges caused by inclusion of a multitude of objects within a user interface, use of manual creation of guides to overcome these challenges, hiding other objects on canvas, use of different zoom levels to focus on a particular anchor point, and so on that hinder user interaction. Further discussion of conflict resolution techniques is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Location Operation Conflict Resolution for Anchor Points

The following discussion describes location operation conflict resolution techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Figure 2:
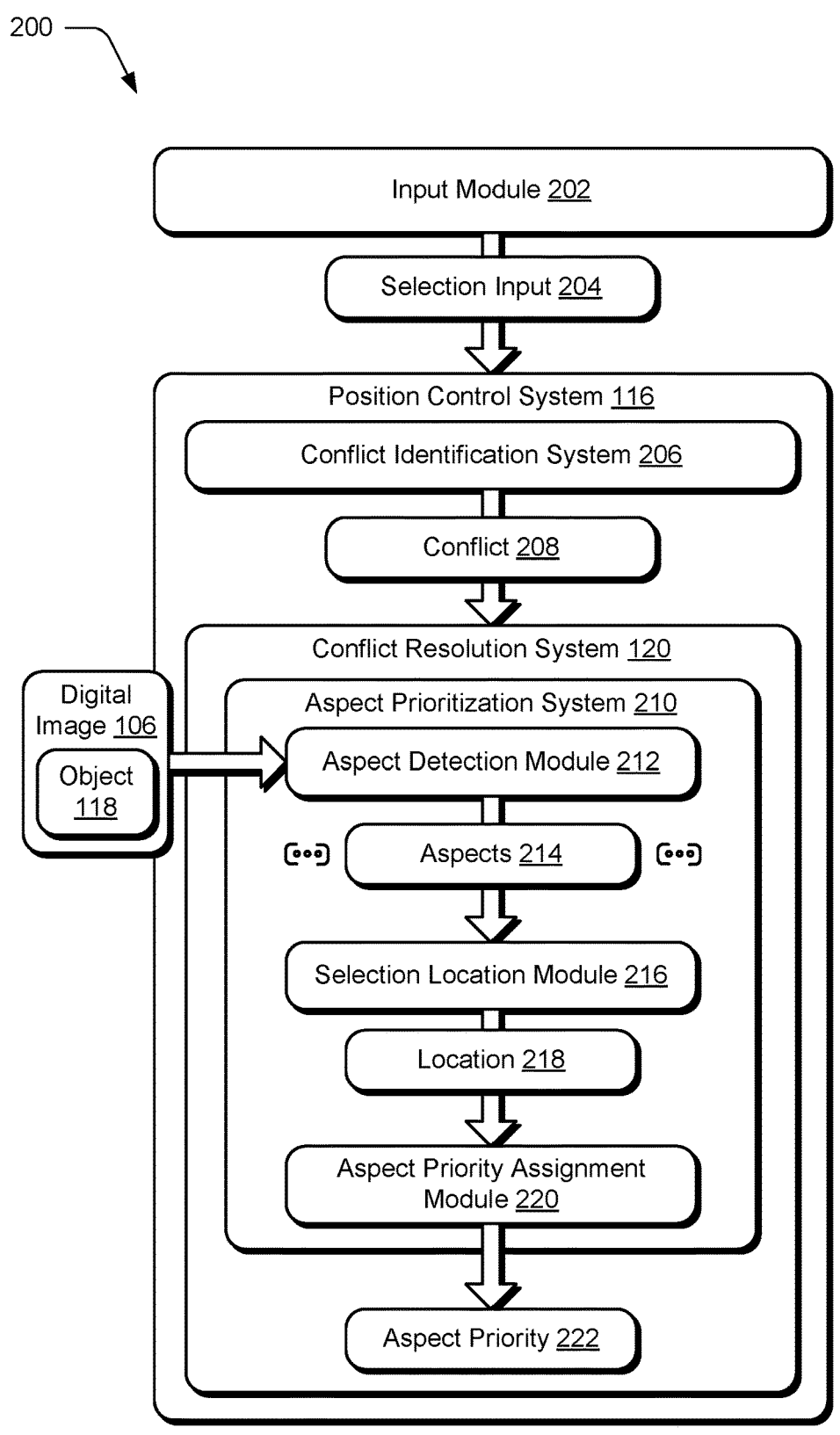
FIG. 2 depicts a system in an example implementation showing operation of a conflict resolution system of FIG. 1 to generate a priority to prioritize aspects of an object.
Figure 3:
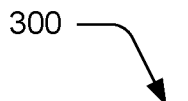
FIG. 3 depicts a system in an example implementation showing operation of the conflict resolution system to resolve a conflict based on a priority generated in FIG. 2.

In portions of the following discussion, reference will be made to FIGS. 1-11. FIG. 2 depicts a system 200 in an example implementation showing operation of the conflict resolution system 120 of FIG. 1 to generate a priority to prioritize aspects of an object. FIG. 3 depicts a system 300 in an example implementation showing operation of the conflict resolution system to resolve a conflict based on the priority generated in FIG. 2. Discussion of these figures is performed in parallel with a procedure 1100 of FIG. 11.

Figure 4:
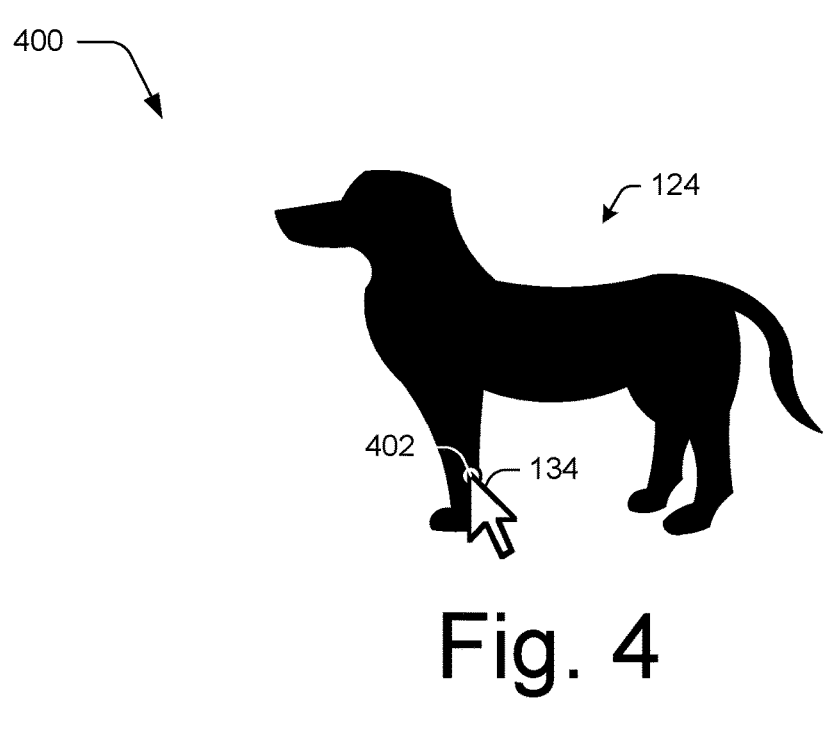
FIG. 4 depicts an example implementation in which a selection input is received with respect to a first object.

To begin, an input module 202 receives a selection input 204 with respect to an object in a user interface (block 1102). FIG. 4 depicts an example implementation 400 in which a selection input 134 is received with respect to the first object 124. The selection input 134 is illustrated in this example as received via a cursor control device. Other examples are also contemplated, such as through use of a gesture and touchscreen functionality of the display device 112. The selection input 134 occurs at a location 402 with respect to the first object 124.

The selection input 204 is received by the position control system 116 to determine which location operations, if any, are applicable to anchor points of the first object 124, e.g., with respect to anchor points of the second object 126. As part of this, a conflict identification system 206 is utilized to detect is there is a conflict, in that, multiple anchor points qualify for location operations at the same time.

Figure 5:
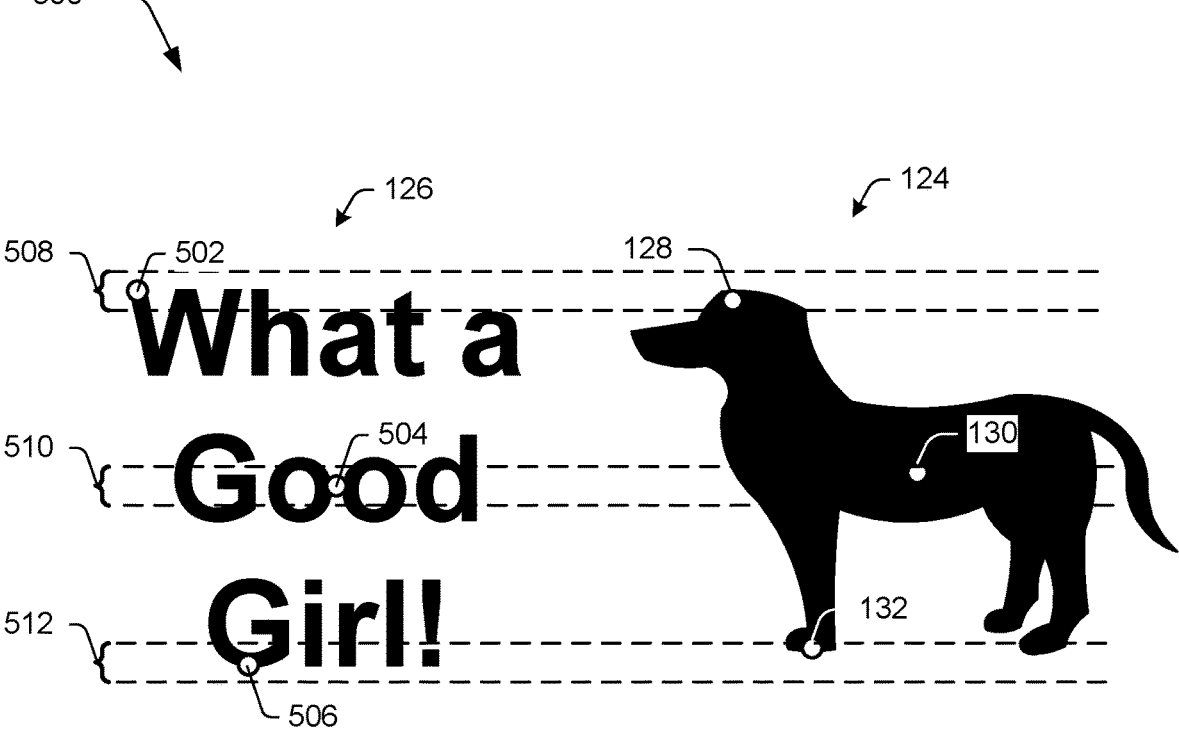
FIG. 5 depicts an example implementation of a conflict in which a plurality of anchor points of a first object simultaneously qualify for location operations with respect to a second object.

FIG. 5 depicts an example implementation 500 of a conflict in which a plurality of anchor points of the first object 124 simultaneously qualify for location operations with respect to a second object 126. The first object 124, as previously described, includes a first anchor point 128, a second anchor point 130, and a third anchor point 132. Likewise, the second object 126 includes a first anchor point 502 defined at a top of the text, a second anchor point 504 at a center of the text, and a third anchor point 506 at a bottom of the text.

In this example, the first, second, and third anchor points 128, 130, 132 of the first object 124 are within respective threshold distances 508, 510, 512 of first, second, and third anchor points 502, 504, 506 of the second object 126. Based on this, the conflict identification system 206 identifies a conflict 208 in which at least two anchor points of an object qualify for a location operation (block 1104) at a same point in time, i.e., simultaneously. This conflict 208 is then forwarded to a conflict resolution system 120 to resolve which location operation and corresponding anchor points is to be made available.

Responsive to receipt of an input indicting the conflict 208 at the conflict resolution system 120, an aspect prioritization system 210 is employed. First, an aspect detection module 212 is utilized to detect a plurality of aspects 214 of the object 118 (block 1106) selected by the selection input 204. Aspects 214 refer to how the first object 124 is "looked at." Therefore, the aspects 214 of the first object 124 are definable as respective directions, at which or from which, the object is viewed.

Figure 6:
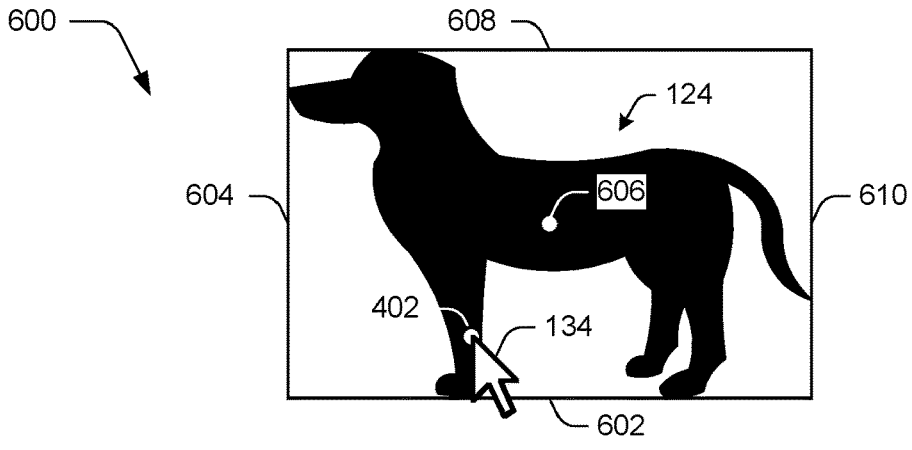
FIG. 6 depicts an example implementation of aspect detection for a first object using a bounding box.

FIG. 6 depicts an example implementation 600 of aspect detection for the first object 124 using a bounding box. The aspect detection module 212 in this example detects the aspects 214 based on a bounding box having a plurality of sides. The bounding box is generated using minimum and maximum X and Y coordinates of the first object 124 in corresponding directions. In this example, the aspects include a first aspect 602, second aspect 604, third aspect 606, a fourth aspect 608, and a fifth aspect 610. The first, second, fourth, and fifth aspects 602, 604, 608, 610 are based on the sides of the bounding box and the third aspect 606 is based on a center of the bounding box. Other examples are also contemplated, including techniques based on a boundary of the object, directions (i.e., viewpoints), and so forth.

Figure 7:
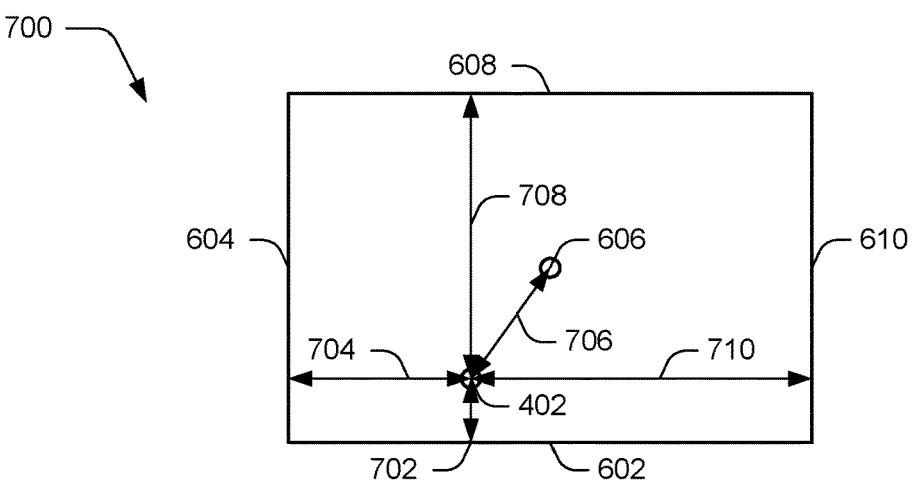
FIG. 7 depicts an example implementation in which a priority is determined based on distances between a location of a selection input and respective aspects.

The aspects 214 are then passed from the aspect detection module 212 to a selection location module 216. The selection location module 216 is used to determine a location 218 of the selection input 204 with respect to the plurality of aspects 214 (block 1108). FIG. 7 depicts an example implementation 700 in which a priority is determined based on distances between the location 402 of the selection input 134 and the aspects 214. A first distance 702 is determined between the location 402 and the first aspect 602 along an X axis. A second distance 704 is determined between the location and the second aspect 604 along the Y axis. Likewise, a third distance 706 is determined between the location 402 and the third aspect 606 (e.g., center) of the bounding box. Fourth and fifth distances 708, 710 are determined between the location 402 and the fourth and fifth aspects 608, 610 along the X and Y axis, respectively. In this way, the distances define a relative amount of closeness of each of the aspects to the location 402 of the selection input 134.

Figure 8:
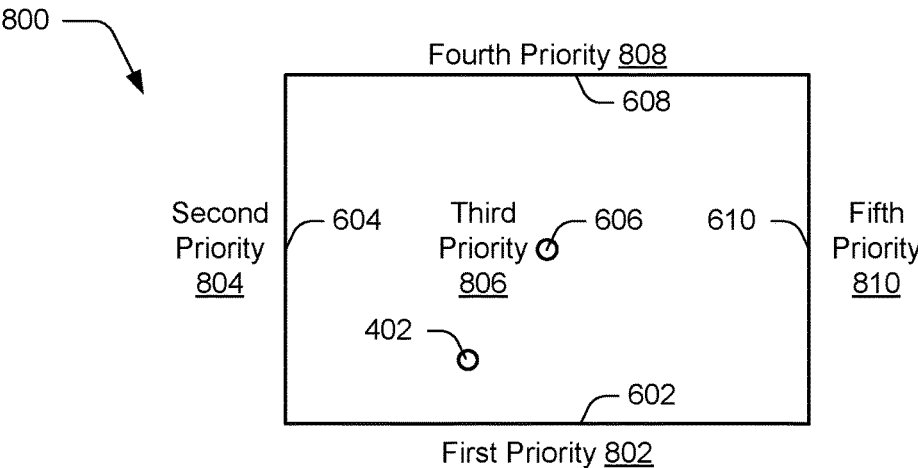
FIG. 8 depicts an example implementation of priority assignment based on distances determined in FIG. 7.

An aspect priority assignment module 220 is then employed by the conflict resolution system 120 to assign a priority (i.e., aspect priority 222) to the plurality of aspects 214 (block 1110). FIG. 8 depicts an example implementation 800 of priority assignment based on distances determined in FIG. 7. The priority is based on "how close" respective aspects are to the location 402 of the selection input. This is used to infer user intent based on a likelihood that a portion of the first object 124 that is closest to the selection input 134 is of user interest as part of a location operation.

Accordingly, a first priority 802 is assigned to the first aspect 602 (e.g., a bottom side of the bounding box) by the aspect priority assignment module 220 as being closest to the location 402. This ordering continues based on the distances as the second aspect 604 (e.g., the left side) is assigned as second priority 804, the third aspect 606 (e.g., the center) is assigned a third priority 806, the fourth aspect 608 (e.g., top side) is assigned a fourth priority 808, and the fifth aspect 610 is assigned the fifth priority 810.

The conflict 208 is resolved based on the priority (block 1112), e.g., the aspect priority 222. In one example, anchor points 302 are processed by an anchor point priority module 304 to assign an anchor point priority 306 based on the aspect priority 222 (block 1114), e.g., based on distance using a distance module 308.

Figure 9:
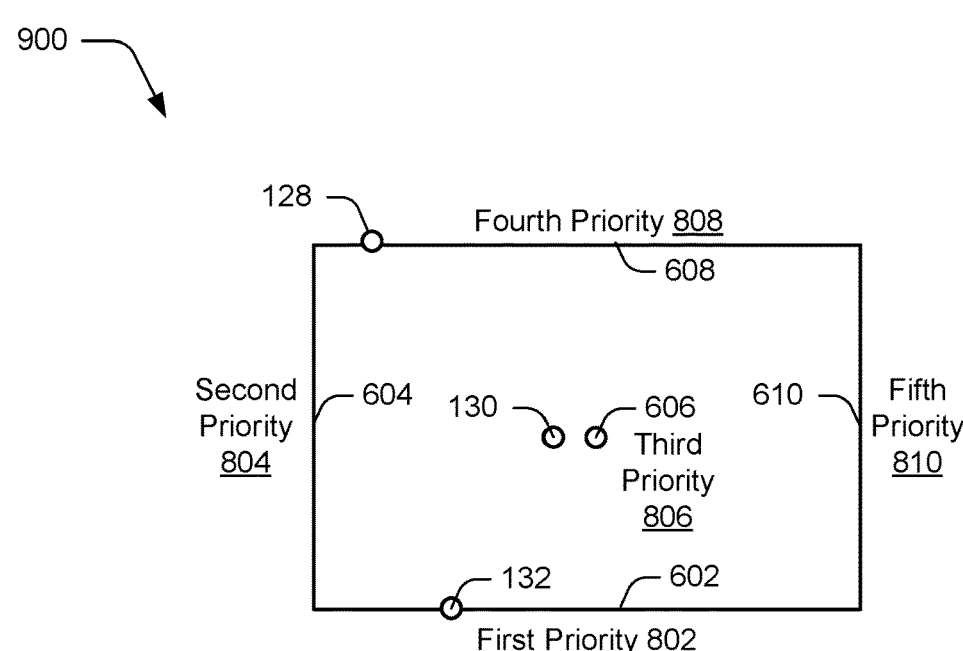
FIG. 9 depicts an example implementation of assigning priority to anchor points of a first object of FIG. 5 based on the aspect priority.

FIG. 9 depicts an example implementation 900 of assigning priority to anchor points of the first object 124 of FIG. 5 based on the aspect priority 222. In this example, distances between the first, second, and third anchor points 128-132 and the first, second, third, fourth, and fifth aspects 602-610 are determined to identify which aspect is closest to a respective anchor point. In this example, the first anchor point 128 lies on the fourth aspect 608, the second anchor point 130 is closest to a third aspect 606, and the third anchor point 132 is on the first aspect 602.

Priorities of these aspects are then assigned to the respective anchor points. For example, the first anchor point 128 is assigned a fourth priority 808, the second anchor point 130 is assigned a third priority 806, and the third anchor point 132 is assigned a first priority 802. The anchor point priority 306 is then utilized by an anchor point resolution module 310 to resolve the conflict and select an anchor point as a resolved anchor point 312.

Continuing the above example, the third anchor point 132 is assigned the highest priority of the three anchor points that qualify for location operations, and therefore is the resolved anchor point 312 that is forwarded to a location operation module 314. The location operation module 314 then controls a location operation 316 (block 1116) as a result of the resolved conflict, e.g., using the resolved anchor point 312.

Figure 10:
FIG. 10 depicts an example implementation in which a location operation is employed for a resolved anchor point.

FIG. 10 depicts an example implementation 1000 in which a location operation is employed for a resolved anchor point. In this example, the location operation involves output of a visual guide 1002 usable to align the third anchor point 132 with a bottom of the second object 126, e.g., the text. The visual guide 1002 acts to indicate a relationship of the third anchor point 132 with respect to the second object 126, and more particularity a respective anchor point of the second object 126. In this way, a single location operation is employed and utilized based on resolution of the conflict. Results of the location operation are then rendered in a user interface 110 by a user interface rendering system 324.

Location operations 316 are configurable in a variety of ways. In a first example, a snapping operation 318 is employed, in which, the resolved anchor point 312 is repositioned with respect to another anchor point when within a threshold distance of the other anchor point. In a second example, an alignment operation 320 is utilized to align the resolved anchor point 312 with another anchor point, e.g., by leveraging visual guides. In a third example, a spacing operation 322 is employed, e.g., through snapping or visual guides to space the resolved anchor point 312 with another anchor point. A variety of other examples are also contemplated that leverage conflict resolution of anchor points and location operations.

Example System and Device

Figure 12:
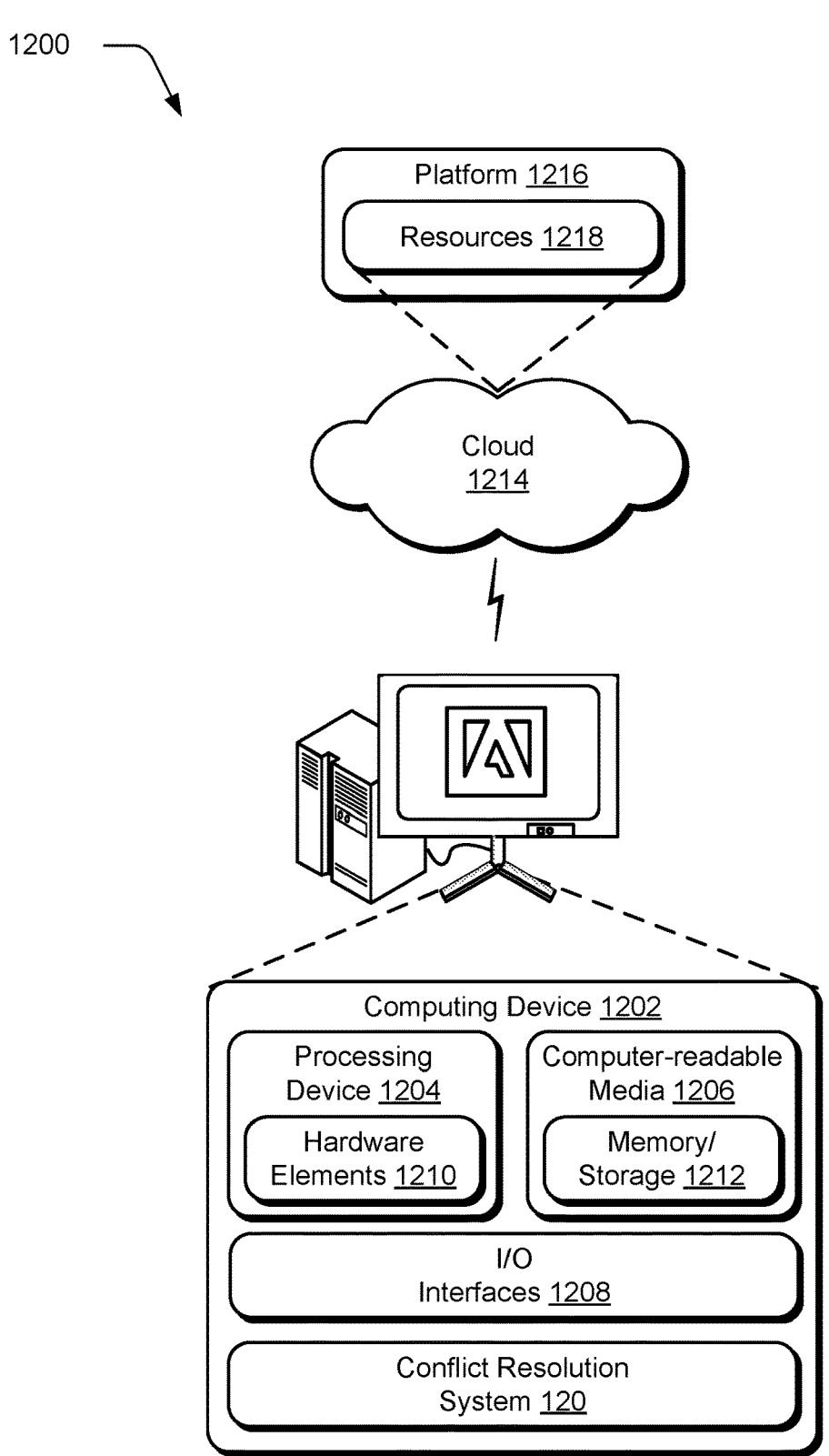
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the conflict resolution system 120. The computing device 1202 is configurable, for example, as a server of a service provider, a device associated with a client (e.g., a client device), an on-chip system, and/or any other suitable computing device or computing system.

The example computing device 1202 as illustrated includes a processing device 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1204 is representative of functionality to perform one or more operations using hardware. Accordingly, the processing device 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing device 1204. The instructions and/or functions are executable/operable by one or more articles of manufacture (for example, one or more computing devices 1202 and/or processing devices 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

In implementations, the platform 1216 employs a "machine-learning model," which refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a selection input involving a location operation for an object with respect to another object in a user interface;
identifying, by a processing device, a conflict in which at least two anchor points, of the object, qualify for the location operation;
detecting, by the processing device, a plurality of aspects of the object in the user interface;
determining, by the processing device, a location of the selection input of the object in the user interface with respect to the plurality of aspects;
assigning, by the processing device, a priority to the plurality of aspects based on the determining;
resolving, by the processing device, the conflict for the at least two anchor points of the object for the location based on the priority resulting in a resolved anchor point of the object;
outputting, by the processing device, a visual guide in the user interface indicating a relationship of the resolved anchor point of the object and an anchor point of the another object in the user interface as part of the location operation; and
controlling, by the processing device, performance of the location operation for the object in the user interface with respect to the another object in the user interface based on the resolving in which the resolved conflict based on the priority is maintained through the selection input and the performance of the location operation with respect to the another object.

2. The method as described in claim 1, wherein the plurality of aspects define a plurality of directions with respect to the object.

3. The method as described in claim 1, wherein the detecting the plurality of aspects is based at least in part of a boundary of the object.

4. The method as described in claim 1, wherein the detecting the plurality of aspects includes generating a bounding box based on the object.

5. The method as described in claim 4, wherein the plurality of aspects is defined based on sides and a center of the bounding box.

6. The method as described in claim 1, wherein the assigning the priority is based on distances between the location of the selection input and the plurality of aspects, respectively.

7. The method as described in claim 1, wherein the resolving the conflict based on the priority is based on distances of the at least two anchor points to respective said aspects.

8. The method as described in claim 1, wherein the location operation is a snapping operation, an alignment operation, or a spacing operation.

9. The method as described in claim 1, further comprising receiving the selection input via a cursor control device or gesture.

10. The method as described in claim 1, wherein the location operation causes movement of the resolved anchor point of the object with respect to the anchor point of the another object in the user interface.

11. A computing device comprising:
a processing device; and
a computer-readable storage medium storing instructions that, responsive to execution by the processing device, causes the processing device to perform operations including:
receiving a selection input involving a location operation for an object with respect to another object in a user interface;
identifying a conflict in which at least two anchor points, of the object, qualify for the location operation;
detecting a plurality of aspects of the object in the user interface, the plurality of aspects based on a plurality of sides and a center of a bounding box of the object;
determining a location of the selection input of the object in the user interface with respect to the plurality of aspects;
assigning a priority to the plurality of aspects based on the determining;
resolving the conflict for the at least two anchor points for the location operation based on the priority resulting in a resolved anchor point of the object;
outputting a visual guide in the user interface indicating a relationship of the resolved anchor point of the object and the anchor point of the another object in the user interface as part of the location operation; and
controlling performance of the location operation for the object in the user interface with respect to the another object in the user interface based on the resolving in which the resolved conflict based on the priority is maintained through the selection input and the performance of the location operation with respect to the another object.

12. The computing device as described in claim 11, wherein the plurality of aspects define a plurality of directions with respect to the object.

13. The computing device as described in claim 11, wherein the detecting the plurality of aspects is based at least in part of a boundary of the object.

14. The computing device as described in claim 11, the detecting the plurality of aspects includes generating a bounding box based on the object.

15. The computing device as described in claim 14, wherein the plurality of aspects is defined based on sides and a center of the bounding box.

16. The computing device as described in claim 11, wherein the assigning the priority is based on distances between the location of the selection input and the plurality of aspects, respectively.

17. The computing device as described in claim 11, wherein the resolving the conflict based on the priority is based on distances of the at least two anchor points to respective said aspects.

18. The computing device as described in claim 11, wherein the location operation is a snapping operation, an alignment operation, or a spacing operation.

19. One or more computer-readable storage media storing instructions that, responsive to execution by a processing device, causes the processing device to perform operations comprising:
receiving a selection input involving a location operation for an object with respect to another object in a user interface;
identifying a conflict in which at least two anchor points, of the object, qualify for the location operation;

detecting a plurality of aspects of the object in a user interface, the plurality of aspects based on a plurality of sides and a center of a bounding box of the object;

determining a location of the selection input of the object in the user interface with respect to the plurality of aspects;

assigning a priority to the plurality of aspects based on the determining;

resolving the conflict of the at least two anchor points for the location operation based on the priority resulting in a resolved anchor point of the object; and controlling performance of the location operation for the object in the user interface based on the resolving in which the resolved conflict for the at least two anchor points is maintained based on the priority through the selection input and the performance of the location operation with respect to the another object.

20. The one or more computer-readable storage media as described in claim 19, wherein the location operation is a snapping operation, an alignment operation, or a spacing operation.

* * * * *